(No Model.)
G. H. MOTTINGER.
THILL COUPLING.
No. 412,648. Patented Oct. 8, 1889.
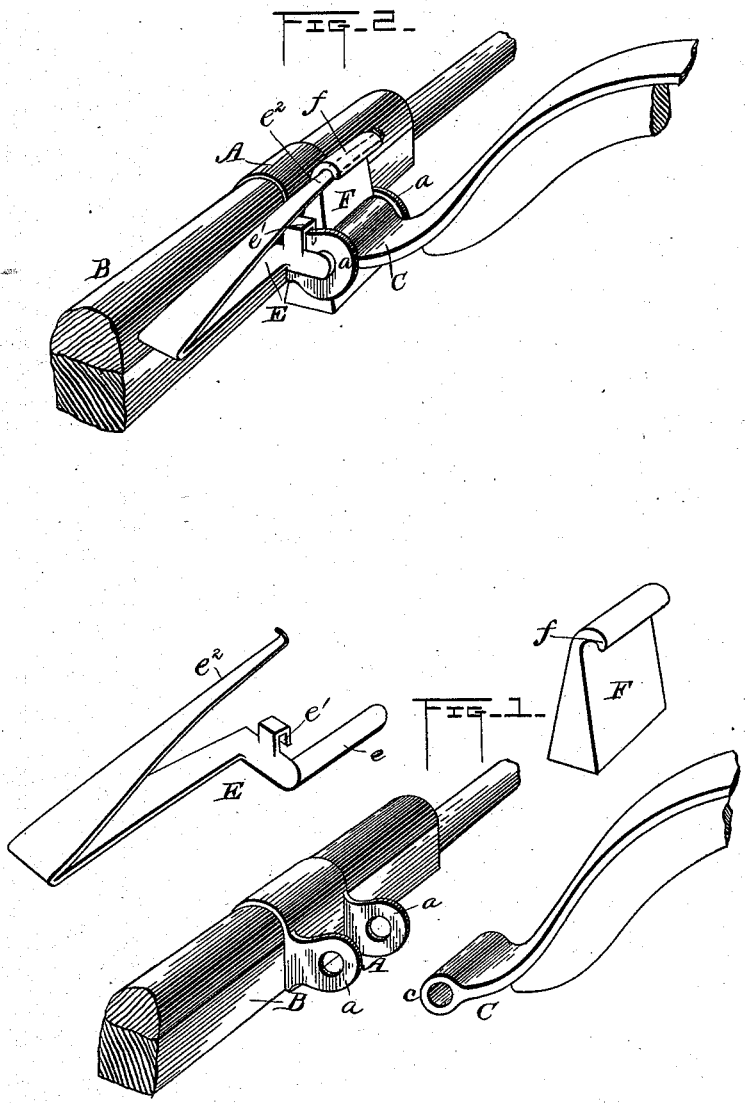
Witnesses
Severance
H. B. Wyman
Inventor
George H. Mottinger
By his Attorney
L. Deane

UNITED STATES PATENT OFFICE.

GEORGE H. MOTTINGER, OF DELL RAPIDS, DAKOTA TERRITORY.

THILL-COUPLING.

SPECIFICATION forming part of Letters Patent No. 412,648, dated October 8, 1889.

Application filed July 15, 1889. Serial No. 317,600. (No model.)

*To all whom it may concern:*

Be it known that I, GEORGE H. MOTTINGER, a citizen of the United States, residing at Dell Rapids, in the county of Minnehaha and Territory of Dakota, have invented certain new and useful Improvements in Thill-Couplings; and I do hereby declare the following to be a full, clear, and exact description of the invention, such as will enable others skilled in the art to which it appertains to make and use the same.

Figure 1 is a perspective view showing the several parts detached. Fig. 2 is a like view showing the device as a whole.

This invention belongs to that class of devices known as "thill-couplers;" and the novelty consists in the construction and combination of the parts composing it, whereby in a simple and durable manner there is provided a secure and anti-rattling fastening that can be readily applied and easily removed when occasion calls for it, all as will now be more fully set forth and described, reference being had to the accompanying drawings.

In the drawings, A denotes the ordinary thill-clip placed on the axle B, and C the thill, its end $c$ ready to be placed between the ears $a$ of the clip. When the thill end has been so placed and the end $e$ of the fastening device E is passed through the holes in the clip and thill and the hook $e'$ of the part E caught upon one of the ears of the clip, the metal wedge F, having a hooked upper end $f$, is placed between the end of the thill and the back of the clip or the axle. At this moment the spring-arm $e^2$ of the part E is caught under the hook $f$ of the wedge. The tension of the spring will draw the wedge up closely and snugly between the thill end and the clip, so that, while allowing all necessary freedom for the movement of the thill, it will so bind and pack the parts together as to prevent all rattling and noise. The office of the hook $e'$ is to hold the device E in place, and thus insure the position of the end $e$ in the holes in the ear and end of the thill.

It will be at once obvious that in the detail of securing the thill in place, or detaching it when occasion requires, either operation can be very easily and very quickly performed. Likewise it will be noted that when the parts are secured together they will be held firmly and securely.

I prefer to make the part E in one piece; but this is chiefly for ease of manufacture. It can readily be made in several pieces and each secured to the other, or adapted to work in unison to produce the desired result. So, also, the hooked tops of wedge F need not be integral with the wedge.

Having now described my invention, what I consider new is—

1. In a thill-coupling, the fastening device E, provided with the cylindrical end portion $e$, for insertion in the eyes of the clip and thill iron, the hook $e'$, to engage on one of the thill-lugs to support the device, and the spring $e^2$, having a hooked end to engage the upper end of a wedge F and draw it upward between the thill-clip and thill-iron, substantially as specified.

2. In a thill-coupling, the combination, with the fastening device E, having the end $e$ for insertion in the eyes of the clip and thill iron, the hook $e'$, to engage one of the thill-lugs, and the spring $e^2$, having a hooked end, of the wedge F, inserted between the thill-lugs and between the clip and thill iron, and provided with the hooked upper end $f$, which engages the hook $e^2$ and prevents the end $e$ of the fastening device from being withdrawn, substantially as specified.

3. The combination, with the thill-clip A, having the perforated lugs $a$, and the thill having the eye $c$ in its iron, of the wedge F, inserted between said lugs and between the clip and thill iron and provided with the upper hooked end $f$, and the fastening device E, having the end $e$ for insertion in the eyes of the lugs $a$ and thill-iron, the hook $e'$, to engage upon one of the clip-lugs, and the spring $e^2$, having a hooked end to engage the hooked end $f$ of the wedge and raise the latter, substantially as specified.

4. In a thill-coupling, the combination, with a clip having perforated lugs and the thill having an eye in its iron between said lugs, of a wedge having its base downward, standing between the thill-lugs and between the clip and thill iron and provided with a curved upper end, and a fastening device mounted on the clip and provided with a cylindrical portion inserted in the eyes of the clip-lugs and thill-iron, and a spring having a hook on its end to engage the hooked upper end of the wedge and draw it upward between the clip and thill iron to prevent the thill from rattling, substantially as specified.

In testimony whereof I affix my signature in presence of two witnesses.

GEORGE H. MOTTINGER.

Witnesses:
D. E. WARD,
ALBION THORNE.